US008296731B2

(12) United States Patent
Tsao et al.

(10) Patent No.: US 8,296,731 B2
(45) Date of Patent: Oct. 23, 2012

(54) DYNAMIC METHOD SELECTION BASED ON DECLARATIVE REQUIREMENTS OF INTERACTION SCOPE

(75) Inventors: Anson Tsao, Redmond, WA (US); Blake Stone, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1286 days.

(21) Appl. No.: 11/714,400

(22) Filed: Mar. 5, 2007

(65) Prior Publication Data

US 2008/0222664 A1    Sep. 11, 2008

(51) Int. Cl.
*G06F 9/44*     (2006.01)

(52) U.S. Cl. .................................................. 717/117

(58) Field of Classification Search .................. 717/117
See application file for complete search history.

(56) References Cited

U.S. PATENT DOCUMENTS

| 5,619,710 | A   | * | 4/1997  | Travis et al. ................... 709/203 |
| 5,625,783 | A   |   | 4/1997  | Ezekiel et al. |
| 6,002,401 | A   |   | 12/1999 | Baker |
| 6,195,092 | B1  |   | 2/2001  | Dhond et al. |
| 6,266,635 | B1  |   | 7/2001  | Sneh |
| 6,415,434 | B1  | * | 7/2002  | Kind .............................. 717/107 |
| 6,429,882 | B1  |   | 8/2002  | Abdelnur et al. |
| 6,513,154 | B1  | * | 1/2003  | Porterfield ....................... 717/101 |
| 6,944,851 | B1  | * | 9/2005  | Dixon, III et al. ............ 717/136 |
| 6,948,135 | B1  |   | 9/2005  | Ruthfield et al. |
| 6,973,417 | B1  | * | 12/2005 | Maxwell et al. ................... 703/2 |
| 7,055,136 | B2  |   | 5/2006  | Dzoba et al. |
| 7,058,890 | B2  |   | 6/2006  | George et al. |
| 7,401,324 | B1  | * | 7/2008  | Dmitriev ....................... 717/130 |
| 7,552,422 | B2  | * | 6/2009  | Gerber et al. .................. 717/124 |
| 2003/0079199 | A1 | * | 4/2003 | Barsness et al. .............. 717/100 |
| 2003/0107597 | A1 |   | 6/2003 | Jameson |
| 2004/0034623 | A1 | * | 2/2004 | Salmen ............................ 707/2 |
| 2004/0056894 | A1 | * | 3/2004 | Zaika et al. .................... 345/762 |
| 2004/0148586 | A1 | * | 7/2004 | Gilboa .......................... 717/108 |
| 2004/0210870 | A1 | * | 10/2004 | Friedman et al. ............. 717/114 |
| 2005/0005248 | A1 |   | 1/2005 | Rockey et al. |
| 2005/0010871 | A1 |   | 1/2005 | Ruthfield et al. |
| 2005/0118996 | A1 |   | 6/2005 | Lee et al. |
| 2005/0198612 | A1 |   | 9/2005 | Gonzalez |
| 2006/0048100 | A1 | * | 3/2006 | Levy et al. .................... 717/124 |
| 2006/0288301 | A1 | * | 12/2006 | Hood et al. ................... 715/762 |

(Continued)

OTHER PUBLICATIONS

Jonsson, et al., "Context Shadow: An Infrastructure for Context Aware Computing", http://www.dsv.su.se/~martinj/thesis/3_PaperA_Jonsson.pdf.

(Continued)

*Primary Examiner* — Emerson Puente
*Assistant Examiner* — Hiren Patel (57) ABSTRACT

Various technologies and techniques are disclosed that dynamically implement method selections based on declarative requirements and interaction scope. Requirements that describe when each of multiple methods that can perform a particular operation should be called can be declared using a declarative syntax. Based upon a program event, the system determines that a request should be made to select a most appropriate method of the available methods to call to perform the particular operation. Upon receiving the request to select the most appropriate method, a sort process is executed that uses an interaction scope of a current user context in combination with a plurality of sort rules to generate a sorted list of the available methods into a particular order based upon appropriateness. A most appropriate method, if any, is returned to the calling application, and then called to perform the particular operation.

13 Claims, 9 Drawing Sheets

U.S. PATENT DOCUMENTS

2007/0033571 A1* 2/2007 Moore et al. .................. 717/104

OTHER PUBLICATIONS

Lanter, David P., "User-Centered Graphical User Interface Design for GIS", Date: Apr. 1991, http://www.ncgia.ucsb.edu/Publications/tech-reports/91/91-6.pdf.

Roman, et al., "A User-Centric, Resource-Aware, Context-Sensitive, Multi-Device Application Framework for Ubiquitous Computing Environments", Date: Jul. 2002, http://iihm.imag.fr/daassi/pourOlfa/contextSensitiveWidgets/AppFrameworkTR.pdf.

* cited by examiner

```
interface IEditorA
{ /* interface methods */ }

[ExtensionProduction(typeof(ICommandHandler))]
[CommandName("Edit.Copy")]
[RequiredFeature( typeof( IEditorA))]
static void Handler1 ( InteractionScope scope, Command command)
{ /* method code */ }
```

FIG. 9

DYNAMIC METHOD SELECTION BASED ON DECLARATIVE REQUIREMENTS OF INTERACTION SCOPE

BACKGROUND

Applications with a graphical user interface provide users with functionality based on where in the application the user is working, commonly called context-sensitive functionality. In some cases, a command may be issued in an identical fashion but have completely different implementations. For example, a copy command implemented in a word processing application acts differently than a copy command implemented in a graphics application. However, the user invokes the copy command in the same way. In cases where an application has been extended by a third party, new implementations of existing commands may be implemented. When the user or system initiates an activity requiring a particular operation to be performed, there is now more than one viable implementation of that same method for handling the operation. It is now up to the application to select the most appropriate implementation for the active context. Current systems handle this situation by searching linearly through a list of user interface elements for the first one that provides the implementation of the command.

SUMMARY

Various technologies and techniques are disclosed that dynamically implement method selections from multiple available methods based on declarative requirements and interaction scope. Requirements describing when each of multiple methods that can perform a particular operation should be called can be declared using a declarative syntax. Based upon a program event, the system determines that a request should be made to select a most appropriate method of the available methods to call to perform the particular operation. Upon receiving the request to select the most appropriate method, a sort process is executed that uses an interaction scope of a current user context in combination with a plurality of sort rules to generate a sorted list of the available methods into a particular order based upon appropriateness. In one implementation, the sort process performs various comparisons to help determine the sort order, such as a comparison based on inheritance, a comparison based on satisfied feature position in the interaction scope, and a comparison based on a number of satisfied features. A result is returned to the calling application based upon the sorted list. In one implementation, the method at the highest ranked in the sorted list is returned. In another implementation, the entire sorted list is returned. In another implementation, an indicator that there was no appropriate method is returned. The most appropriate method is then called to perform the particular operation, if applicable.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a framework for resolving multiple method implementations, but the system also serves other purposes in addition to these. In one implementation, one or more of the techniques described herein can be implemented as features with any graphical user interface application that is based on context sensitive interaction patterns. In another implementation, one or more of the techniques described herein can be implemented as features within a software development program such as MICROSOFT® VISUAL STUDIO®, or from any other type of program or service that provides frameworks for developing software applications.

In one implementation, a system is provided that identifies an appropriate method to call from multiple available methods for performing the same operation. Methods can have declarative attributes that describe what features a calling application should be made available before this method should be called. At some point during operation of the calling application, it will become necessary to determine which method to call to handle a particular operation from the multiple methods that are available to handle that same operation. The system dynamically generates an interaction scope representing a current context of the user. The term "interaction scope" as used herein is meant to include the various layers of user context that describe a current computing environment of the user. For example, at the most narrow level in an interaction scope, the user may be working on a particular selection, that selection may be contained within an editor, and that editor may be contained in a particular document. These context-sensitive details form part of the interaction scope of the current context of the user. Features of an interaction scope are the objects that compose the interaction scope and are identified by their type. Different interaction scopes have different sets of features, enabling the system to tell them apart. The features are arranged in the various layers which ranks the features as more or less specific.

The system uses this interaction scope in combination with multiple sort rules to generate an ordered list of the methods in order of appropriateness. In other words, based upon the context of the user represented in the interaction scope, and various other sort criteria, the system can determine which method is the most appropriate one to call to handle that operation given the user's current context. By using a declarative approach, the methods can be sorted without loading their implementation in memory. Furthermore, by using the declarative approach, new implementations for a particular method can specify the feature requirements for when they should be called, without requiring calling applications that may want to use those methods to be re-compiled to handle the new situation.

Figure 1:
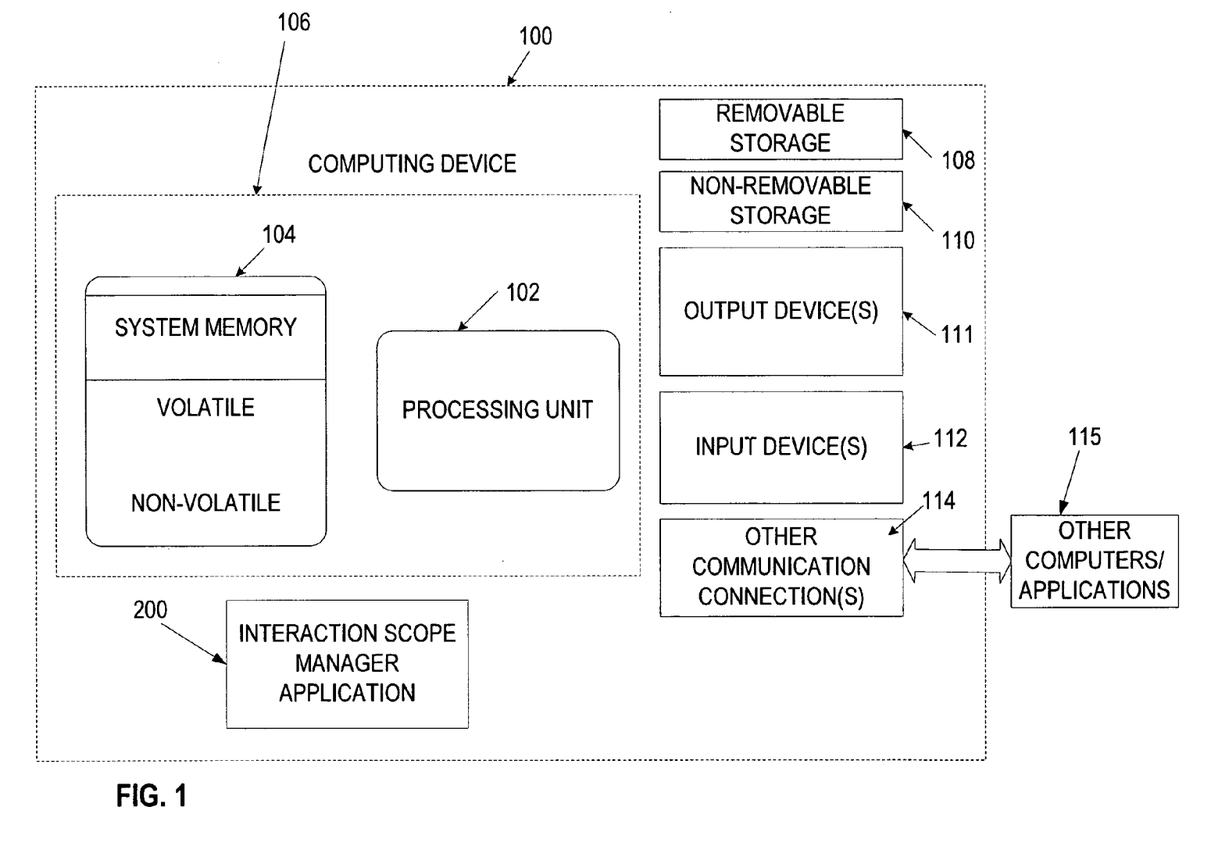
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes interaction scope manager application 200. Interaction scope manager application 200 will be described in further detail in FIG. 2.

Figure 2:
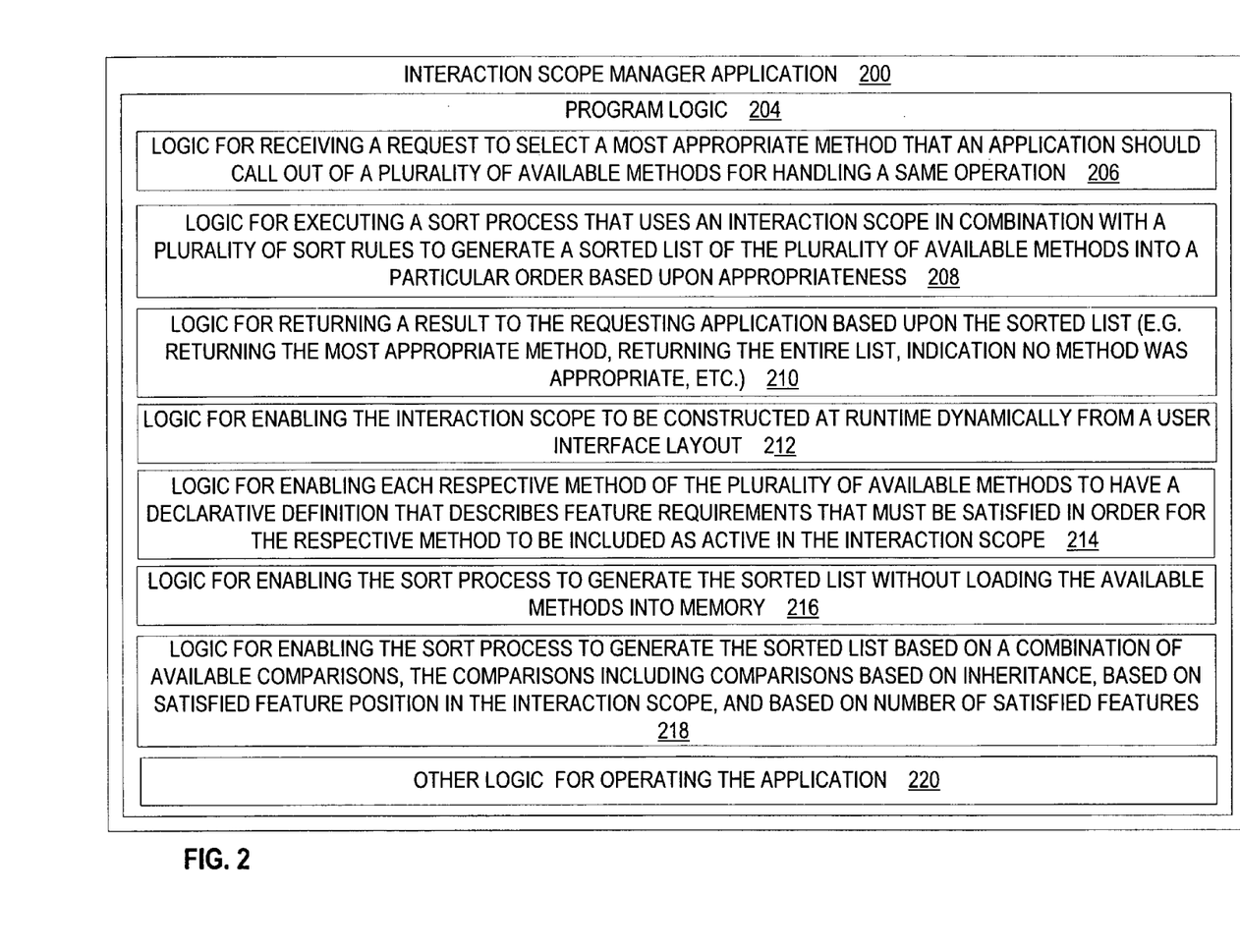
FIG. 2 is a diagrammatic view of an interaction scope manager application of one implementation operating on the computer system of FIG. 1.

Turning now to FIG. 2 with continued reference to FIG. 1, an interaction scope manager application 200 operating on computing device 100 is illustrated. Interaction scope manager application 200 is one of the application programs that reside on computing device 100. However, it will be understood that interaction scope manager application 200 can alternatively or additionally be embodied as computer-executable instructions on one or more computers and/or in different variations than shown on FIG. 1. Alternatively or additionally, one or more parts of interaction scope manager application 200 can be part of system memory 104, on other computers and/or applications 115, or other such variations as would occur to one in the computer software art.

Interaction scope manager application 200 includes program logic 204, which is responsible for carrying out some or all of the techniques described herein. Program logic 204 includes logic for receiving a request to select a most appropriate method that an application should call out of a plurality of available methods for handling a same operation 206; logic for executing a sort process that uses an interaction scope in combination with a plurality of sort rules to generate a sorted list of the plurality of available methods into a particular order based upon appropriateness 208; logic for returning a result to the requesting application based upon the sorted list (e.g. returning the most appropriate method, returning the entire list, indication there was no proper match) 210; logic for enabling the interaction scope to be constructed at runtime dynamically from a user interface layout 212; logic for enabling each respective method of the plurality of available methods to have a declarative definition that describes feature requirements that must be satisfied in order for the respective method to be included as active in the interaction scope 214; logic for enabling the sort process to generate the sorted list without loading the available methods into memory 216; logic for enabling the sort process to generate the sorted list based on a combination of available comparisons, the comparisons including comparisons based on inheritance, based on satisfied feature position in the interaction scope, and based on number of satisfied features 218; and other logic for operating application 220. In one implementation, program logic 204 is operable to be called programmatically from another program, such as using a single call to a procedure in program logic 204.

Figure 3:
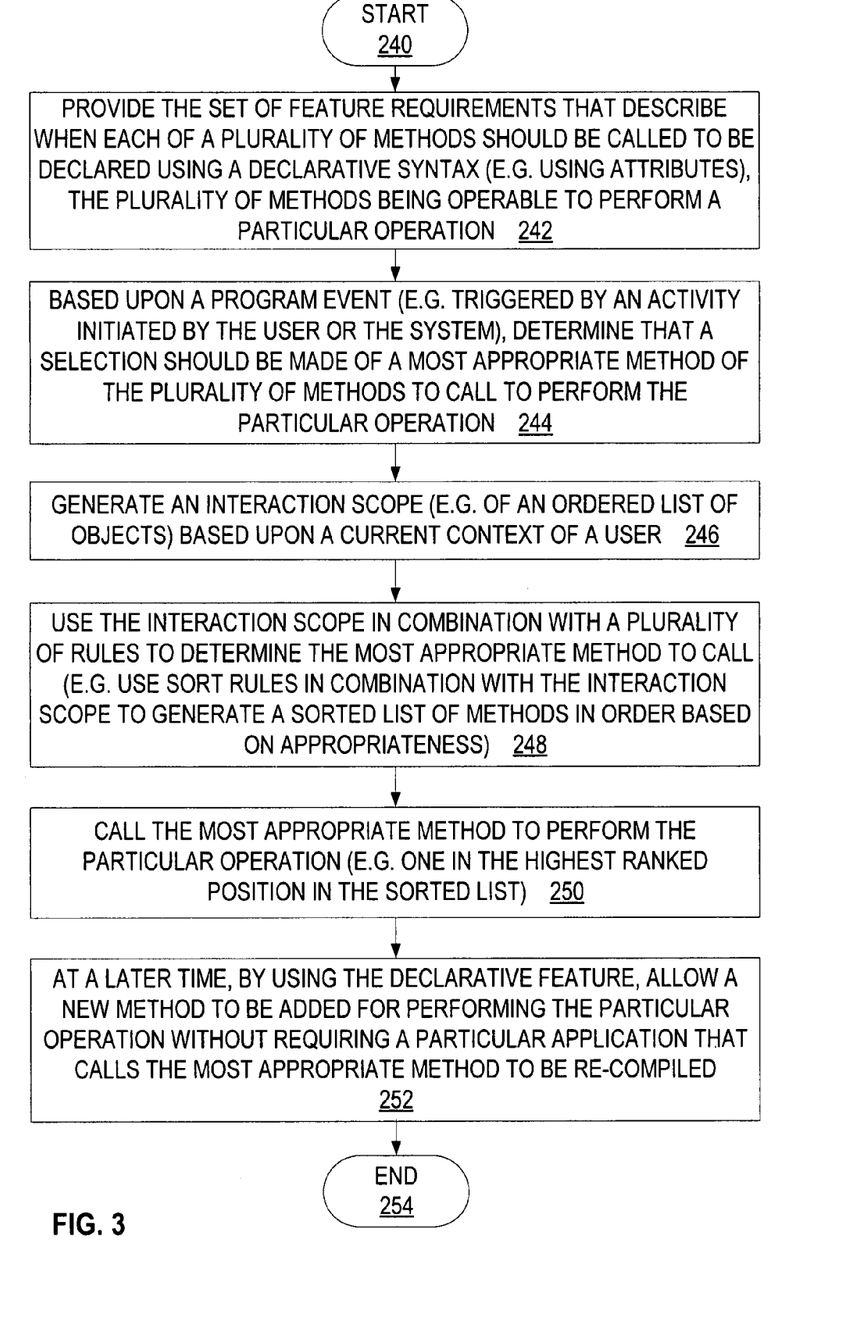
FIG. 3 is a high-level process flow diagram for one implementation of the system of FIG. 1.

Turning now to FIGS. 3-7 with continued reference to FIGS. 1-2, the stages for implementing one or more implementations of interaction scope manager application 200 are described in further detail. FIG. 3 is a high level process flow diagram for interaction scope manager application 200. In one form, the process of FIG. 3 is at least partially implemented in the operating logic of computing device 100. The process begins at start point 240 with providing the set of feature requirements that describe when each of a plurality of methods should be called to be declared using a declarative syntax (e.g. using attributes), the methods being operable to perform a particular operation (stage 242). Based upon a program event (e.g. triggered by an activity initiated by the user or the system), the system determines that a selection should be made of a most appropriate method of the methods to call to perform the particular operation (stage 244).

The system generates an interaction scope (e.g. of an ordered list of objects) based upon a current context of a user (stage 246). The interaction scope is used in combination with a plurality of rules to determine the most appropriate method to call (stage 250). In one implementation, sort rules are used in combination with the interaction scope to generate a sorted list of methods in order based on appropriateness) (stage 248). The system calls the most appropriate method to perform the particular operation (e.g. one in the highest ranked in the sorted list) (stage 250). At a later time, the declarative feature allows a new method to be added for performing the particular operation without requiring a particular application that calls the most appropriate method to be re-compiled (stage 252). The process ends at end point 254.

The selection of a most appropriate method to call (e.g. the method selection mechanism) as described in FIG. 3 can be used in various situations to respond to user-generated or system-generated activities. As one non-limiting example, this method selection mechanism may be used to select between command implementations for user interface idioms such as menus, toolbars, and ribbons. As another non-limiting example, this method selection mechanism may be used to implement context sensitive keyboard shortcuts to commands, allowing the same keyboard sequence to invoke different commands in different user contexts. As yet another non-limiting example, this method selection mechanism may be used to select between different input processing extensions, such as keyboard, mouse, voice, pen, etc. that are most appropriate for the user context. Alternatively or additionally, this method selection mechanism can also be used to select between different command user interface presentations, such as a different set of commands visible in the menu, context menu, toolbar, etc.

Figure 4:
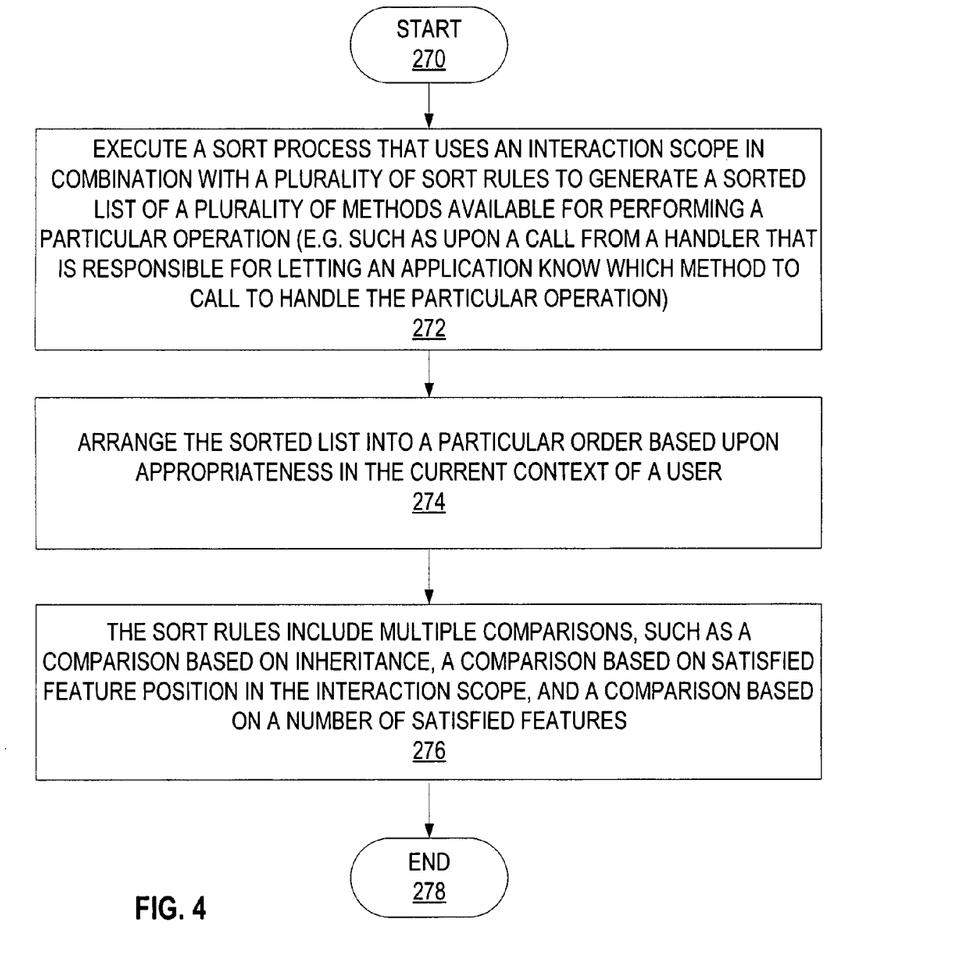
FIG. 4 is a process flow diagram for one implementation of the system of FIG. 1 illustrating the high level stages involved in sorting the multiple available methods using an interaction scope in combination with multiple sort rules.

FIG. 4 illustrates one implementation of the high level stages involved in sorting the multiple available methods using an interaction scope in combination with multiple sort rules. In one form, the process of FIG. 4 is at least partially implemented in the operating logic of computing device 100. The process begins at start point 270 with executing a sort process that uses an interaction scope in combination with a plurality of sort rules to generate a sorted list of a plurality of methods available for performing a particular operation (stage 272). In one implementation, the sort process is called by a handler that is responsible for letting a particular application know which of the methods to call to handle the particular operation (stage 272). The sort process determines which methods are most applicable given the current interaction scope. Those items that have more specific feature requirements are ranked as more applicable. Requirements that are satisfied by features provided at higher levels of the interaction scope are more relevant to the ranking. This way, items that are most specific in their demands on the topmost part of the user interface are the ones that are judged to be the most applicable.

The system arranges the sorted list into a particular order based upon appropriateness in the current context of the user (stage 274). The sort rules include multiple comparisons, such as a comparison based on inheritance, a comparison based on satisfied feature position in the interaction scope, and a comparison based on a number of satisfied features (stage 276). In one implementation, two or more of these or other comparisons are performed to help select the most appropriate method. Fewer or additional comparisons can be performed in alternate implementations. The process ends at end point 278.

Figure 5:
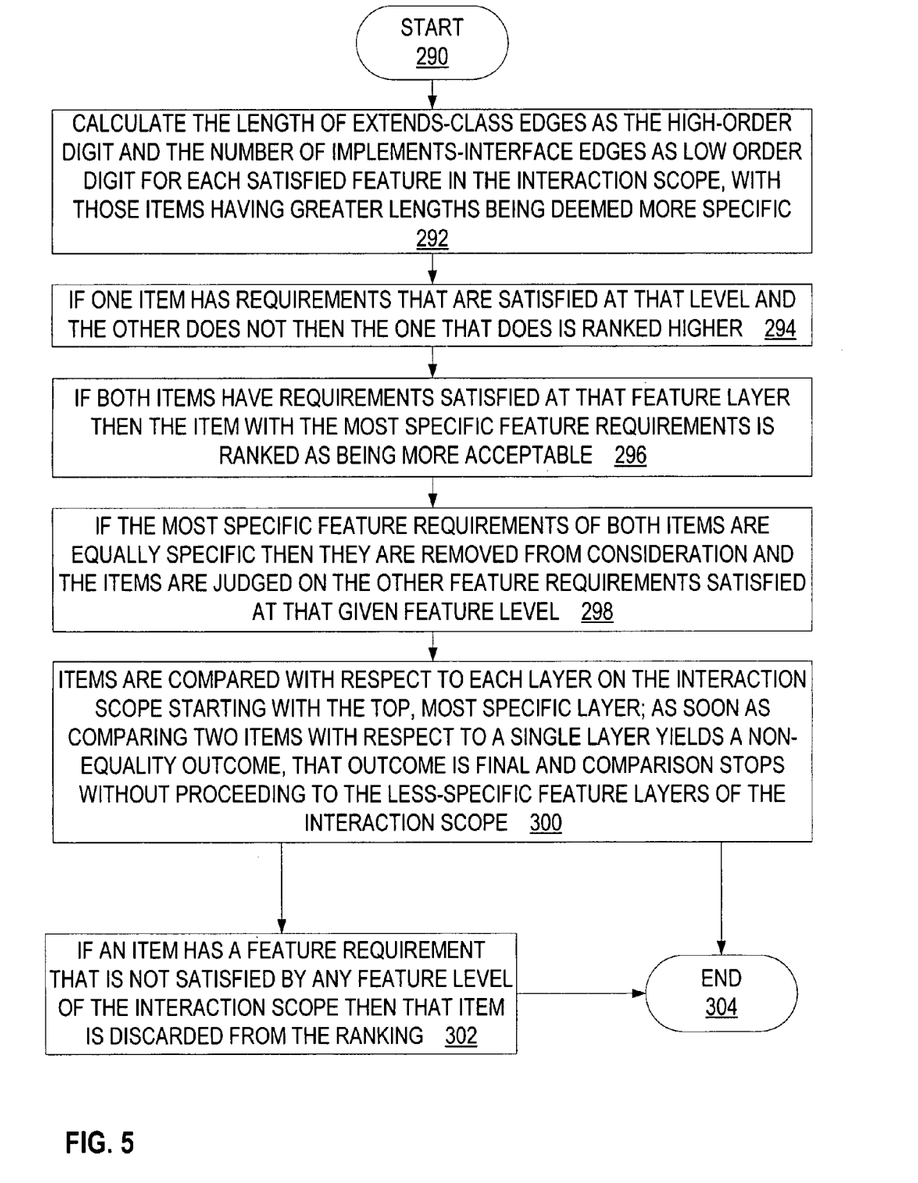
FIG. 5 is a process flow diagram for one implementation of the system of FIG. 1 illustrating the more detailed stages involved in sorting the multiple available methods using an interaction scope in combination with multiple sort rules.

FIG. 5 illustrates one implementation of the more detailed stages involved in sorting the multiple available methods using an interaction scope in combination with multiple sort rules. In one form, the process of FIG. 5 is at least partially implemented in the operating logic of computing device 100. The process begins at start point 290 with calculating the length of extends-class edges as the high-order digit and the number of implements-interface edges as low order digit for each satisfied feature in the interaction scope, with those items having greater lengths being deemed more specific (stage 292). If one item has requirements that are satisfied at that level and the other does not, then the one that does is ranked higher (stage 294). If both items have requirements satisfied at that feature layer, then the item with the most specific feature requirements is ranked as being more acceptable (stage 296). If the most specific feature requirements of both items are equally specific, then they are removed from consideration and the items are judged on the other feature requirements satisfied at that given feature level (stage 298). Items are compared with respect to each layer on the interaction scope starting with the top, most specific layer (stage 300). As soon as comparing two items with respect to a single layer yields a non-equality outcome, that outcome is final and comparison stops without proceeding to the less-specific feature layers of the interaction scope (stage 300). If an item has a feature requirement that is not satisfied by any feature level of the interaction scope, then that item is discarded from the ranking (stage 302). The process ends at end point 304.

Figure 6:
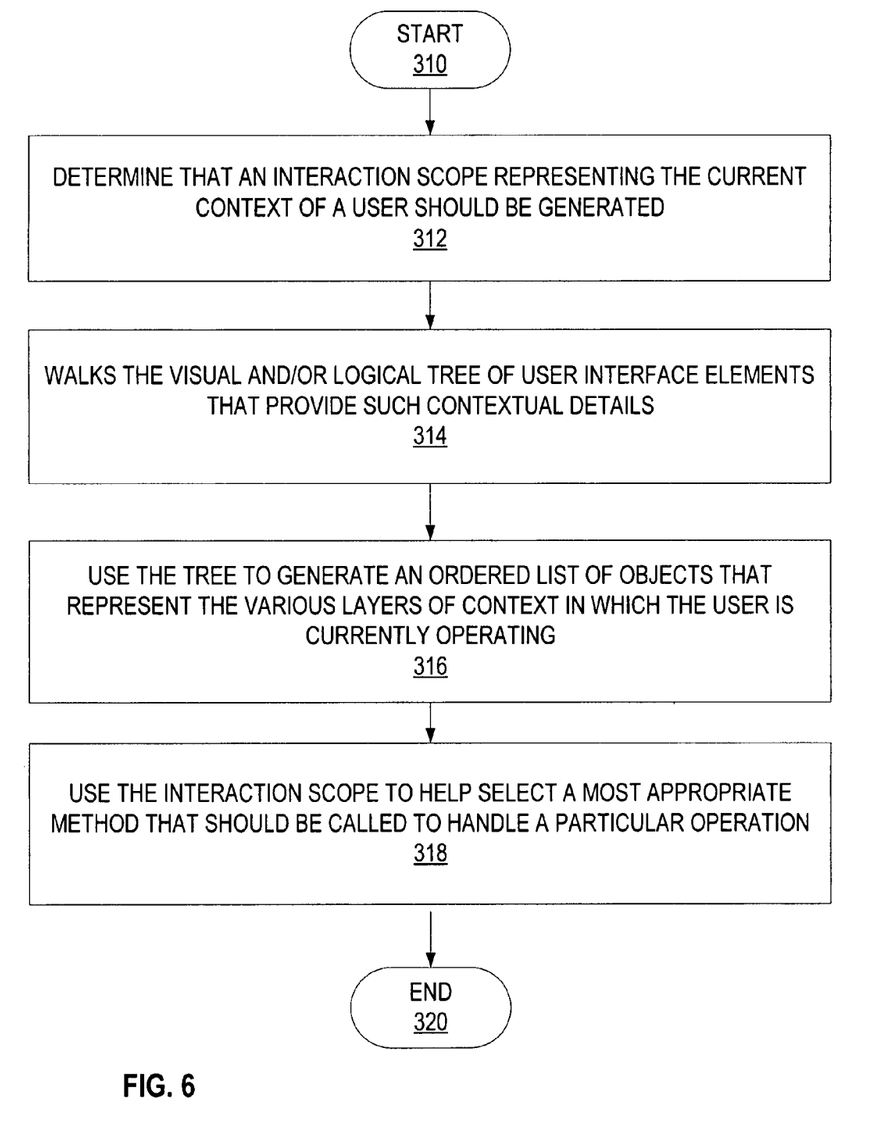
FIG. 6 is a process flow diagram for one implementation of the system of FIG. 1 illustrating the stages involved in generating an interaction scope based upon a current context of the user.

FIG. 6 illustrates one implementation of the stages involved in generating an interaction scope based upon a current context of the user. In one form, the process of FIG. 6 is at least partially implemented in the operating logic of computing device 100. The process begins at start point 310 with determining that an interaction scope representing the current context of a user should be generated (stage 312). The system walks the visual and/or logical tree of user interface elements that provide such contextual details (stage 314). In other words, the system analyzes the user interface element containment hierarchy that is formed by the parent-child relationships of the user interface elements to get these contextual details. Alternatively or additionally, a more static set of contextual layers could be generated. This tree is then used to generate an ordered list of objects that represent the various layers of context in which the user is currently operating (stage 316). This interaction scope is then used to help select a most appropriate method that should be called to handle a particular operation (stage 318). The process ends at end point 320.

Figure 7:
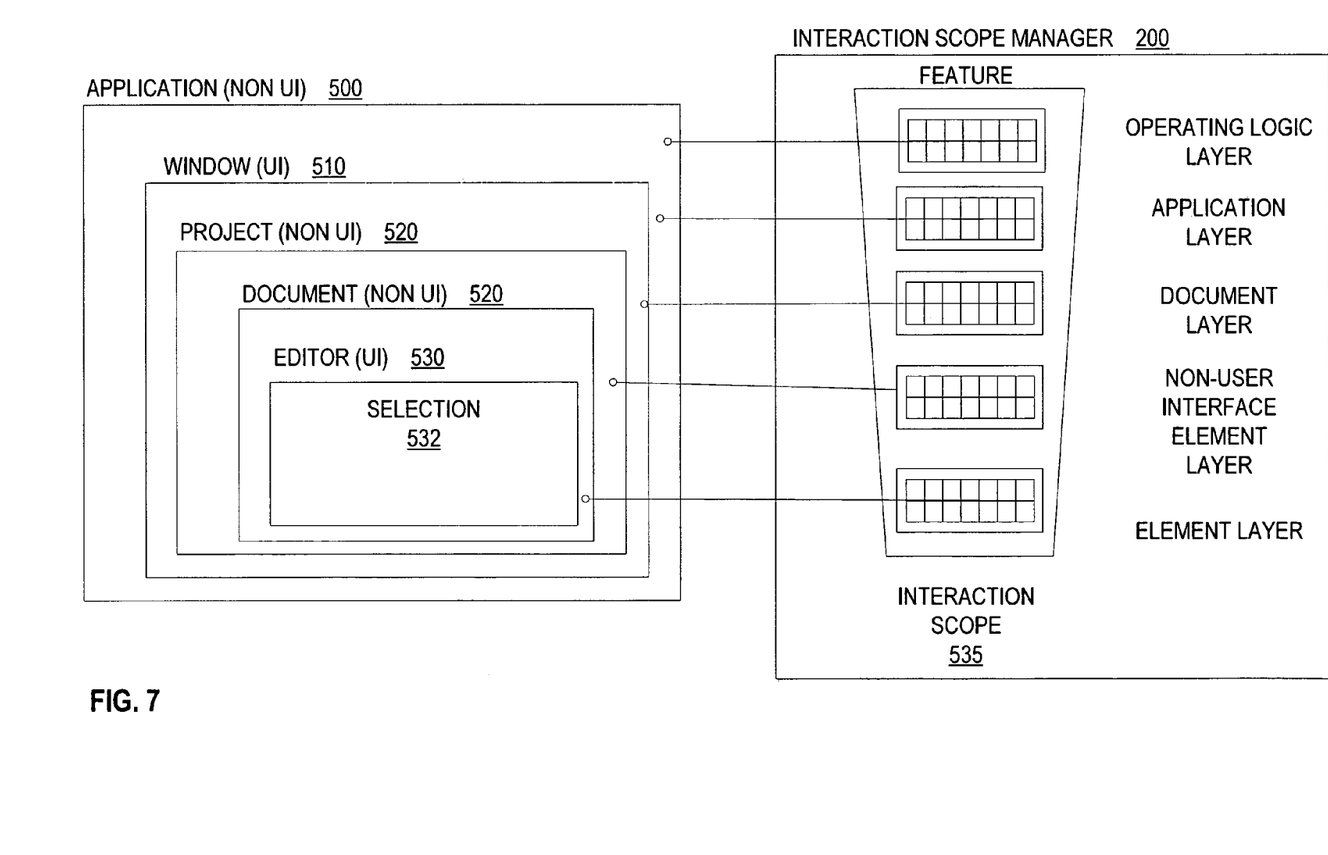
FIG. 7 is a diagram for one implementation of the system of FIG. 1 that illustrates an exemplary interaction scope of an element within a computer program.

FIG. 7 is a diagram for one implementation of the system of FIG. 1 that illustrates an exemplary interaction scope of an element within a computer program. An selection 532 exists within an editor (UI) 530, which is layered within a document (non-UI) 520, which is layered within project (non-UI) 520 which is layered within window (UI) 510 which, in turn, is layered within application (non UI) 500 for a computing device 100. In one implementation, for each of the user interface elements, the data context associated with the element is also retrieved. The data context is a non-UI element that provides the data to be presented in the UI element. Other objects can be attached to the UI elements that will appear as features in the interaction scope layer, and those objects are also non-UI elements. Each of these items and their relationship with each other make up the interaction scope 535. Each unit (e.g. application, window, project, document, editor, selection, etc.) may provide features that the user may invoke. In one implementation, interaction scope manager application 200 builds the interaction scope starting from one user interface element, such as one with keyboard focus. Using the user interface element, the interaction scope manager application 200 walks the user interface hierarchy, and from the user interface hierarchy forms the layers in the interaction scope. The features associated with the user interface elements and their data context is then obtained. In one implementation, the way the interaction scope is built is not fixed, but extensible.

This interaction scope 535 is then used in combination with the sort process to determine which method is the most appropriate method to call for implementing the particular feature. In other words, the set of methods are sorted against a particular runtime configuration of the interaction scope 535. In one implementation, the interaction scope 535 is an ordered data structure that can supply the instantiation of the types specified in the feature requirements. For example, an implementation of the cut command may require the existence of "ITextEditor" in the interaction scope. The interaction scope will have an instantiation of the ITextEditor type if the user is currently working in the text editor, but if the user is currently working in a graphics editor, ITextEditor will not be in the interaction scope.

Figure 8:
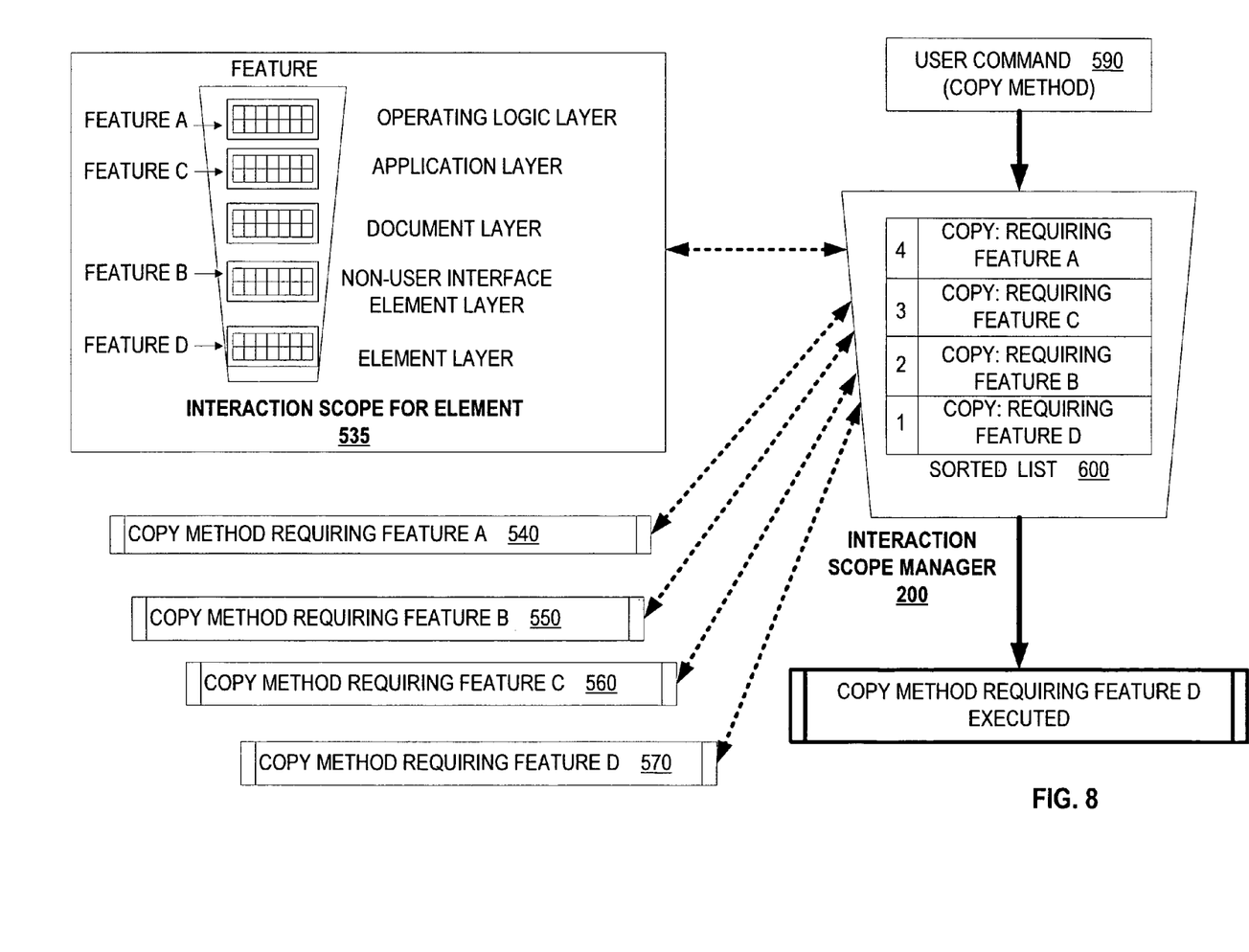
FIG. 8 is a diagram for one implementation illustrates how a particular method is selected from multiple available methods for performing the same operation.

Turning now to FIG. 8, a diagram for one implementation illustrates how a particular method is selected from multiple available methods for performing the same operation. A user issues a command, such as a copy command 590. The interaction scope manager application 200 collects feature information from the various methods that support the issued command. The feature requirements for these methods are the "type" of objects that need to be available in the interaction scope in order for the method to apply. There can be zero or more feature requirements.

In the example shown, there are various copy methods with the same interface, but each with different feature requirements (540, 550, 560, and 570). The methods are not always directly associated with their feature requirements. They can be implemented as part of different subsystems within the application. For example, a copy method associated with a text editor does not need to be implemented with the text editor subsystem. This allows a third party to add new commands to existing subsystems.

These collected methods are then sorted using a sort process into a sorted list 600. The sort process uses sort rules in combination with the interaction scope 535 to determine the most appropriate order. In one implementation, the method that is first in the sorted list is then executed. In other implementations, methods that are in other orders in the list can be executed. In yet another implementation, no method may be executed if it is determined that none of them are appropriate.

Figure 9:
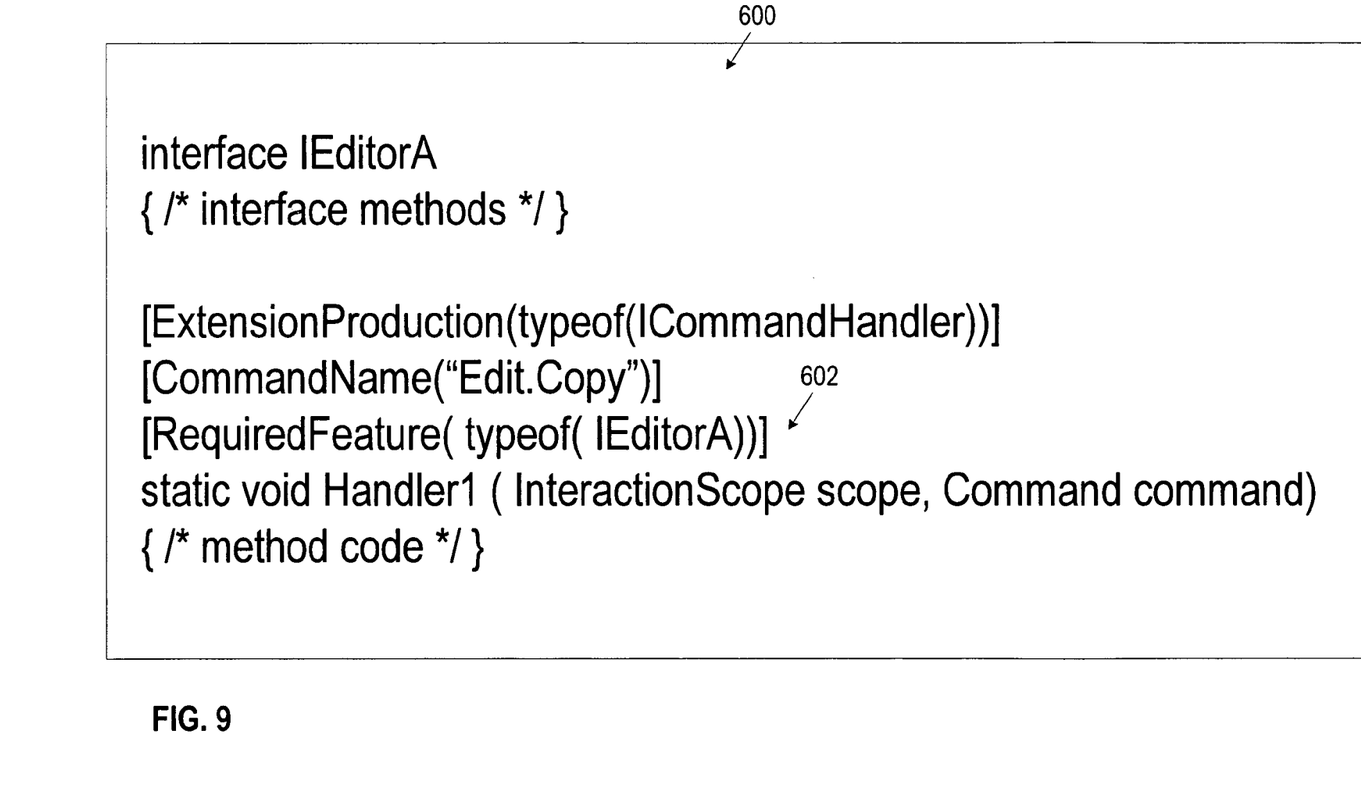
FIG. 9 is exemplary source code that illustrates using a declarative syntax to declare requirements for when the method should be called, along with other details for the method.

FIG. 9 is exemplary source code 600 that illustrates using a declarative syntax to declare requirements for when the method should be called 602, along with other details for the method. In the example shown, an interface, IEditorA, is created which acts as a contract. This means that any object implementing that interface will implement all the methods described in the interface. A method called Handler1 is then created which accepts as parameters an object of type InteractionScope and an object of type Command. Further, the method is described with attributes using a declarative syntax which indicate which features are required to be present in the interaction scope for this method to be active. In the hypothetical example shown in FIG. 9, the method has been described with an attribute CommandName with a value Edit.Copy which indicates that this method implements a copy method. In addition, the method has been described with an attribute RequiredFeature 602 and has a value of IEditorA indicating that this method will only function if IEditorA is available as a feature of the interaction scope.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-readable storage medium, the computer-readable storage medium not consisting of a propagating signal, the computer-readable storage medium having computer-executable instructions for causing a computer to perform steps comprising:

receive a request to select a most appropriate method that an application should call out of a plurality of available methods for handling a same operation, wherein each respective method of the plurality of available methods is operable to have a declarative definition based on a declarative feature, the declarative definition describes one or more feature requirements that must be satisfied in order for the respective method to be included as active in an interaction scope, wherein the declarative feature allows a new method to be added for performing a particular operation without requiring a particular application that calls a most appropriate method to be re-compiled to add the new method;

at runtime, dynamically construct the interaction scope based on analysis of a user interface element containment hierarchy formed by parent-child relationships of user interface elements and at least one non-user interface element that provides data to be presented in a user interface element, the interaction scope further constructed based upon a current context of the user by analyzing various layers of user context that describe a current computing environment of the user;

execute a sort process that uses the interaction scope in combination with a plurality of sort rules to generate a sorted list of the plurality of available methods into a particular order based upon appropriateness, wherein the sort process is operable to generate the sorted list without loading the plurality of available methods into memory, wherein the sort process is operable to generate the sorted list based on available comparisons, the available comparisons comprising a comparison based on inheritance, a comparison based on satisfied feature position in the interaction scope, and a comparison based on a number of satisfied features, with a method having satisfied features that are more specific in demands on a top most part of a user interface determined to be most appropriate; and return a result to the requesting application based upon the sorted list.

2. The computer-readable storage medium of claim 1, wherein the respective method is operable to be included as active in the interaction scope if all of the one or more feature requirements of the respective method are satisfied.

3. The computer-readable storage medium of claim 1, wherein the result is the sorted list.

4. The computer-readable storage medium of claim 1, wherein the result is a particular method of the plurality of available methods that has been determined to be most appropriate.

5. A method for dynamically selecting a method based on declarative requirements comprising the steps of:

providing a declarative feature that allows requirements that describe when each of a plurality of methods should be called to be declared using a declarative syntax, the plurality of methods being operable to perform a particular operation, each method of the plurality of methods comprising an attribute that describes a requirement for the method, wherein the declarative feature allows a new method to be added for performing the particular operation without requiring a particular application that calls the most appropriate method to be re-compiled to add the new method;

based upon a program event, determining that a selection should be made of a most appropriate method of the plurality of methods to call to perform the particular operation;

using a computing device comprising a processing unit coupled to a memory, generating an interaction scope based upon a current context of a user by analyzing various layers of user context that describe a current computing environment of the user;

using the computing device, using the interaction scope in combination with a plurality of rules to determine the most appropriate method to call by executing a sort process that uses the interaction scope in combination with a plurality of sort rules to generate a sorted list of the plurality of available methods into a particular order based upon appropriateness, wherein the sort process is operable to generate the sorted list without loading the plurality of available methods into memory, wherein the sort process is operable to generate the sorted list based on available comparisons, the available comparisons comprising a comparison based on inheritance, a comparison based on satisfied feature position in the interaction scope, and a comparison based on a number of satisfied features, with a method having satisfied features that are more specific in demands on a top most part of a user interface determined to be most appropriate; and calling the most appropriate method to perform the particular operation.

6. The method of claim 5, wherein the program event is triggered by an activity initiated by the user.

7. The method of claim 5, wherein the program event is triggered by an activity initiated by a system.

8. The method of claim 5, wherein the most appropriate method is one at a highest ranked in the sorted list.

9. The method of claim 5, wherein the interaction scope is an ordered list of objects that describe the current context of the user.

10. A computer-readable storage medium, the computer-readable storage medium not consisting of a propagating signal, the computer-readable storage medium having computer-executable instructions for causing a computer to perform the steps recited in claim 5.

11. A method for sorting multiple methods for performing a particular operation into a particular order comprising the steps of:

using a computing device comprising a processing unit coupled to a memory, executing a sort process that uses an interaction scope in combination with a plurality of sort rules to generate a sorted list of a plurality of methods available for performing a particular operation, the interaction scope determined by analyzing various layers of user context that describe a current computing environment of the user, the sorted list being sorted into a particular order based upon appropriateness of a current context of a user, and the plurality of sort rules comprising a comparison based on inheritance, a comparison based on satisfied feature position in the interaction scope, and a comparison based on a number of satisfied features, wherein each respective method of the multiple methods for performing the particular operation is operable to have a declarative definition based on a declarative feature, the declarative definition describes one or more feature requirements that must be satisfied in order for the respective method to be included as active in the interaction scope, wherein the declarative feature allows a new method to be added for performing a particular operation without requiring a particular application that calls a most appropriate method to be re-compiled to add the new method.

12. The method of claim 11, wherein the sort process is called by a handler that is responsible for letting a particular application know which of the plurality of methods to call to handle the particular operation.

13. A computer-readable storage medium, the computer-readable storage medium not consisting of a propagating signal, the computer-readable storage medium having computer-executable instructions for causing a computer to perform the steps recited in claim 11.

* * * * *